US010581533B2

(12) United States Patent
Petrioli et al.

(10) Patent No.: US 10,581,533 B2
(45) Date of Patent: Mar. 3, 2020

(54) METHOD FOR MANAGING IN AN ADAPTIVE AND JOINT WAY THE ROUTING POLICY AND THE RETRANSMISSION POLICY OF A NODE IN AN UNDERWATER NETWORK, AND MEANS FOR ITS IMPLEMENTATION

(71) Applicant: UNIVERSITA' DEGLI STUDI DI ROMA "LA SAPIENZA", Rome (IT)

(72) Inventors: Chiara Petrioli, Rome (IT); Francesco Lo Presti, Rome (IT); Valerio Di Valerio, Rome (IT); Daniele Spaccini, Rome (IT); Luigi Picari, Sutri (IT)

(73) Assignee: Universita Degli Studi Di Roma "La Sapienza", Rome (IT)

( * ) Notice: Subject to any disclaimer, the term of this patent is extended or adjusted under 35 U.S.C. 154(b) by 0 days.

(21) Appl. No.: 15/768,312

(22) PCT Filed: Oct. 14, 2016

(86) PCT No.: PCT/IB2016/056165
§ 371 (c)(1),
(2) Date: Apr. 13, 2018

(87) PCT Pub. No.: WO2017/064661
PCT Pub. Date: Apr. 20, 2017

(65) Prior Publication Data
US 2018/0302172 A1 Oct. 18, 2018

(30) Foreign Application Priority Data
Oct. 16, 2015 (IT) .......................... 102015000062628

(51) Int. Cl.
*H04B 13/02* (2006.01)
*H04L 1/16* (2006.01)
(Continued)

(52) U.S. Cl.
CPC ........... *H04B 13/02* (2013.01); *H04L 1/1657* (2013.01); *H04L 1/188* (2013.01); *H04L 1/1825* (2013.01);
(Continued)

(58) Field of Classification Search
CPC .. H04B 13/02; H04W 40/023; H04W 40/125; H04L 45/08; H04L 1/188; H04L 1/1657;
(Continued)

(56) References Cited

U.S. PATENT DOCUMENTS 9,191,304 B1 * 11/2015 Plate ................... H04L 12/6418
2004/0071082 A1 4/2004 Basu et al.
(Continued)

FOREIGN PATENT DOCUMENTS

WO WO-2015012970 A2 1/2015

OTHER PUBLICATIONS

Hu et al. "QELAR: A Machine-Learning-Based Adaptive Routing Protocol for Energy-Efficient and Lifetime-Extended Underwater Sensor Networks", Feb. 3, 2010, IEEE.*
(Continued)

*Primary Examiner* — Jae Y Lee
(74) *Attorney, Agent, or Firm* — Harness, Dickey & Pierce, PLC

(57) ABSTRACT

The method of the invention envisages determining, for each packet that is to be transmitted/retransmitted, through an LLC communication protocol, which is the top sublayer of the datalink layer of the ISO-OSI model, (LLC logic) autonomously, node by node, the specific communication apparatus to be used from the ones available on the single node, to which subset of the nodes said packet is to be transmitted (routing logic), i.e., the number and the set of neighbouring nodes to which it is to be transmitted, the specific communication apparatus to be used from the (Continued)

multiple ones that may be available, and the maximum number of retransmissions to be made, by using a decentralized self-learning algorithm that enables each node to learn and select dynamically the best operating mode, according to the number of transmissions already made.

12 Claims, 4 Drawing Sheets

(51) Int. Cl.
*H04L 1/18* (2006.01)
*H04L 12/751* (2013.01)
*H04W 40/02* (2009.01)
*H04W 40/12* (2009.01)
*H04W 28/02* (2009.01)
*H04L 1/00* (2006.01)

(52) U.S. Cl.
CPC ......... *H04L 45/08* (2013.01); *H04W 28/0236* (2013.01); *H04W 40/023* (2013.01); *H04W 40/125* (2013.01); *H04L 2001/0093* (2013.01); *H04L 2001/0097* (2013.01)

(58) Field of Classification Search
CPC ........... H04L 1/1825; H04L 2001/0097; H04L 2001/0093
See application file for complete search history.

(56) References Cited

U.S. PATENT DOCUMENTS

| | | | |
|---|---|---|---|
| 2011/0019693 A1* | 1/2011 | Fu | H04L 69/32 370/469 |
| 2012/0192026 A1 | 7/2012 | Chen et al. | |
| 2013/0114424 A1* | 5/2013 | Maguluri | H04W 28/021 370/252 |
| 2017/0105163 A1* | 4/2017 | Hu | H04W 40/06 |

OTHER PUBLICATIONS

Francesco et al. "Reliability and Energy-efficiency in IEEE 802.15.4/ZigBee Sensor Networks: An Adaptive and Cross-layer Approach", Sep. 2011, IEEE.*
Stefano Basagni et al; CARP: A Channel-aware routing protocol for underwater acoustic wireless networks; Ad Hoc Networks, 34, 92-104; 2015.
R. Plate et al; Utilizing kinematics and selective sweeping in reinforcement learning-based routing algorithims for underwater networks; Ad Hoc Networks 34, 105-120; 2015.
Tiansi Hu et al.; QELAR: A machine-learning-based adaptive routing protocol for energy-efficient and lifetime-extended underwater sensor networks; IEEE Transactions on Mobile Computing, vol. 9, No. 6, Jun. 2010.
Richard Sutton et al.; Reinforcement learning: An introduction; The MIT Press, Cambridge, Massachusetts; Nov. 5, 2017.
International Search Report and Written Opinion dated Feb. 2, 2017.
International Search Report and Written Opinion of the International Searching Authority issued in PCT/IB2016/056165, dated Feb. 2, 2017; ISA/EPO.

* cited by examiner

METHOD FOR MANAGING IN AN ADAPTIVE AND JOINT WAY THE ROUTING POLICY AND THE RETRANSMISSION POLICY OF A NODE IN AN UNDERWATER NETWORK, AND MEANS FOR ITS IMPLEMENTATION

FIELD OF THE INVENTION

The present invention relates to the sector of communications in underwater sensor networks and more specifically to a method for dynamic determination of the logic for retransmission of the packets by the nodes of a network in order to optimize the performance of the network itself.

The use of UWSNs (Underwater Wireless Sensor Networks) affords a wide range of applications such as, among other things, environmental monitoring, monitoring of critical infrastructures and of offshore platforms, surveillance of ports and coasts, etc.

An underwater sensor network (FIG. 1) is made up of a set of nodes, appropriately positioned to cover the area of interest and located at various depths, some of which may be mobile autonomous vehicles. Each node is equipped with sensors and one or more communication apparatuses. The nodes collect from the surrounding environment data, which, after a step of local processing, are sent to one or more data-collector or sink nodes that store/handle/transport the data elsewhere on the basis of the type of application. The exchange of data may also regard sending of commands or information on the state of the devices.

Creation of a communication network between nodes calls for solution of the various problems that characterize communication in underwater environment. In the first place, given the limits imposed by the underwater environment on the use of electromagnetic waves (which are markedly attenuated in water), the communication has up to the present day typically been obtained via acoustic waves, which implies marked propagation delays (of the order of seconds) and a limited transmission band (a few kilobits per second). Furthermore, as amply demonstrated by the multiple experimental campaigns, there is present a considerable heterogeneity, variability of the quality, and asymmetry of the communication channels between the nodes, with transmission characteristics markedly depending upon various conditions such as depth, temperature, salinity, profile of the seabed, condition of the surface wind, noise produced, for example, by passing watercraft, etc., conditions that are moreover subject to variations that are frequently unforeseeable over time, even over short periods.

In this context, taking into account above all the critical aspects of the applications of underwater sensor networks, one of the main challenges is a reliable communication, i.e., the capacity of guaranteeing that the packets generated by the various nodes will be delivered to the sink nodes (and this in a reasonable time).

A first solution to increase reliability of communications is the flooding technique, which exploits the broadcast nature inherent in acoustic communication: each packet is addressed to all nodes, and each node that receives a packet sends it back again in broadcast mode. However, if on the one hand this solution maximizes the likelihood of the packets reaching the sink node, the cost, in terms of energy consumption, increase in network traffic with corresponding risk of network collapse as the number of collisions increase—with marked reduction of the throughput and consequent even uncontrolled increase of the delays—renders this solution unsatisfactory or rarely practicable.

To maintain the advantages and simplicity of the flooding techniques, preventing the disadvantages thereof outlined above, various approaches adopt limited flooding solutions, where each node sends each packet to a restricted set of other nodes: if each node sends its own traffic to just one node we have a single path, i.e., classic unipath routing without any redundancy; if one or more nodes send their own traffic to a number of network nodes, there are a number of network paths—and hence redundancy—and routing is a multipath routing.

Another solution to increase communication reliability consists in using retransmission techniques. For each packet transmitted, the transmitting node goes into a wait state where it waits for acknowledgement of receipt thereof by the addressee nodes. In underwater sensor networks, given the lack of network band, there is a widespread use of implicit acknowledgments: exploiting the broadcast communication means, a packet is considered as having been successfully sent if a node detects that at least one of the nodes to which it had sent the packet retransmits it. If, instead, no copy of the packet is detected, it is assumed that none of the nodes has received it, and the packet is retransmitted after a backoff period. A packet is retransmitted a certain number of times, after which it is rejected. In this case, the maximum number of retransmissions plays an important role: a very high value of retransmissions increases the likelihood of delivery but at the same time increases the network latency, the energy consumption, and in turn increases the network traffic.

The inventive idea underlying the present invention consists in combining the policy of choice of the relay nodes (routing function) with the retransmission policy in order to optimize the performance from the standpoint of reliability of the transmissions, of network latency, and of energy consumption. The choice is made in a dynamic and adaptive way, by applying an algorithm executed by each node (and hence distributed), which enables the nodes to learn and select dynamically the best number and set of neighbours to which to transmit each packet and the maximum number of times in which to retransmit each packet.

Optimization is made locally by each node on the basis of the local information exchanged and enables definition of the operating mode of the node. Different nodes may behave in different ways (i.e., part of the network can follow a unipath protocol, whilst another area of the network uses a multipath protocol, or even a flooding protocol).

Even though in the literature adaptive routing solutions [BaPe14] [HuFe10] [PlWa14] have recently been proposed, these solutions present limits in terms of performance and envisage a far more limited use of adaptivity as compared to the solution proposed. The same considerations may apply in regard to the two patent applications [US2026] and [US1082]. The first patent does not propose a routing strategy, but only a technique of retransmission of the packets. The proposal according to the present invention, however, differs therefrom because the present retransmission strategy does not envisage explicit exchange of feedback between the network nodes. The patent [US2004/071082], on the other hand, regards a routing protocol that is exclusively of a unipath type and does not offer any dynamicity as the number of retransmissions of a packet varies.

In effect, the present invention enables definition of a procedure that introduces the local logic of a cross-layering "meta-protocol", enabling the network to operate in time according to different protocols, and different portions of the network to operate according to different protocol logics, this being an essential characteristic for optimizing performance, and being altogether absent in the prior-art solutions.

DESCRIPTION OF THE INVENTION

Summary

In the field of underwater sensor networks, the present invention consists in combining the policy of choice of the relay nodes (i.e., of the nodes to which to transmit the packet in order to route it towards the sink node) with the retransmission policy in order to obtain the best performance from the standpoint of reliability of transmissions, of network latency, and of energy consumption (and/or a combination thereof). In particular:
- a method is proposed for dynamic determination of the transmission mode and of the nodes to which the packets are to be forwarded according to the number of retransmissions of that packet already made;
- the method is entirely decentralized: each node determines autonomously the set of the nodes for forwarding according to the number of transmissions already made;
- the method is identical for all the nodes;
- the method is dynamic: as the network conditions vary, using a self-learning algorithm (which is in turn decentralized) each node can modify its own policy in terms of number and identity of the nodes chosen as addressees and/or the number of retransmissions to be attempted for a given packet.

Even though the method is distributed and identical for each node, it is based upon learning of the network conditions on the basis of exchange of local information between neighbouring nodes (where by "neighbouring nodes" are meant nodes that have the capacity of receiving correctly the transmissions made by each other), leading in effect the network to optimize its overall performance, exploiting the possibility of enabling the nodes of the system to operate in a different way (different number of relays chosen for each transmission, different number of retransmissions used by the nodes).

Further characteristics of the invention will emerge clearly from the ensuing description with reference to the attached plates of drawings, in which.

Figure 5:
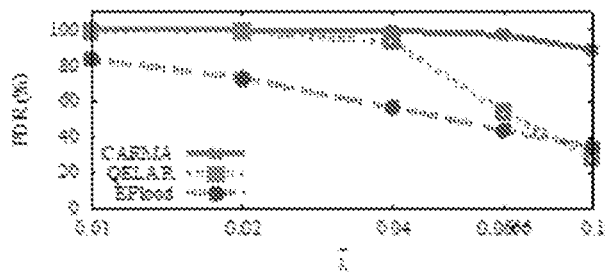
FIG. 5 shows the PDR (i.e., the packet-delivery ratio, which is the ratio between the number of packets received correctly by the sink node and the number of packets generated by the nodes) as a function of the network traffic, setting in comparison the CARMA protocol according to the invention with the known QELAR and EFlood protocols.
Figure 6:
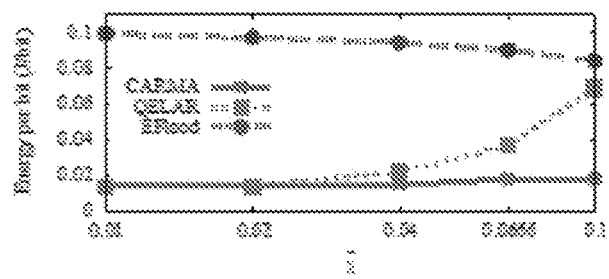
FIG. 6 shows the different plots of the energy consumed by the network for correct delivery of a data bit to the sink node, as a function of the network load, in the three reference protocols of FIG. 5.
Figure 7:
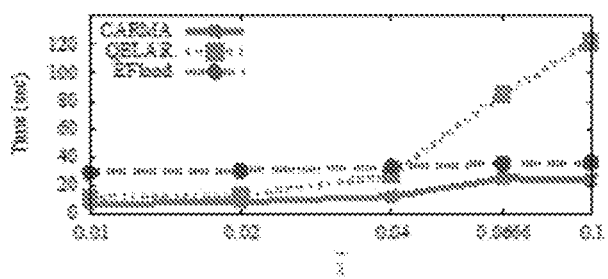
Figure 8:
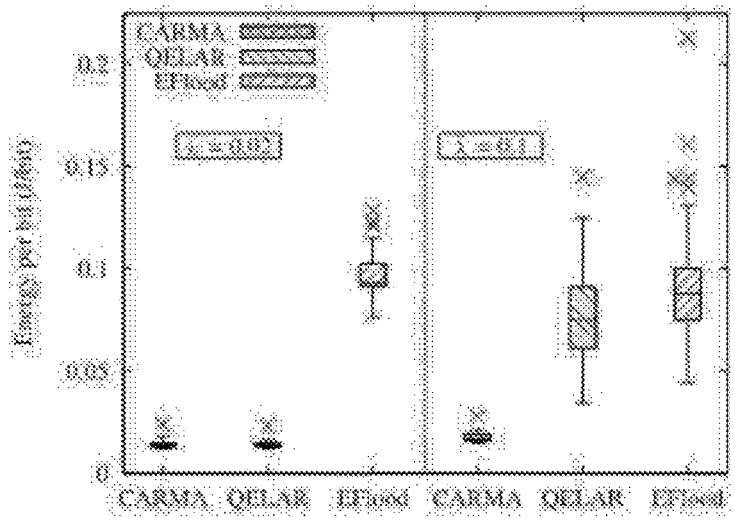

FIG. 7 compares the mean latency defined as the time between generation of the packets and the time of their correct delivery to the sink node in the three different protocols of FIGS. 5 and 6; and FIG. 8 shows the energy spent by the network nodes for successful delivery of a bit of information in the case of low and high traffic.

DETAILED DESCRIPTION OF THE INVENTION

Figure 1:
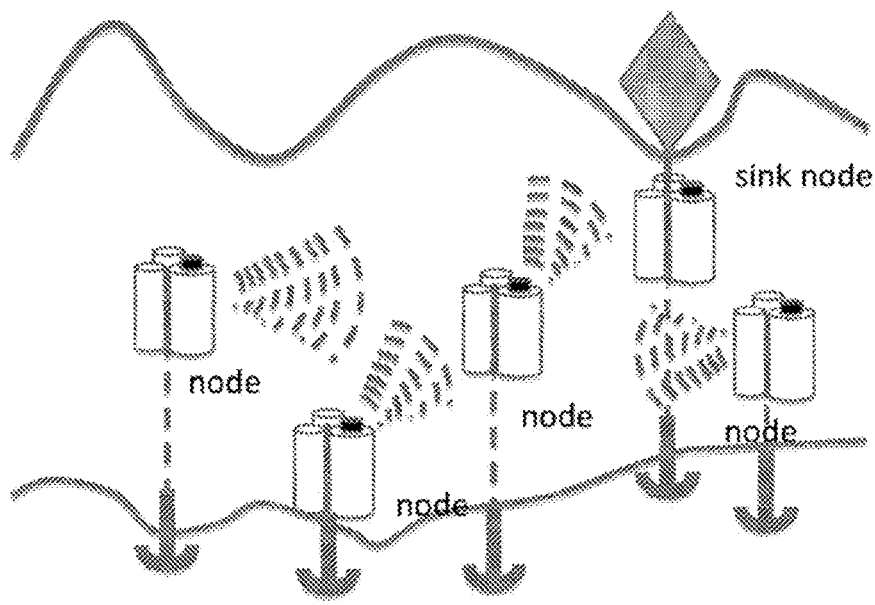
FIG. 1 is a schematic illustration of a standard underwater network.

With reference to the figures, consider an underwater sensor network as that of FIG. 1, made up of a plurality of nodes appropriately positioned to cover the area of interest. Irrespective of whether the node is fixed or is represented by a mobile vehicle, each node is equipped with sensors and one or more communication apparatuses. The nodes collect from the surrounding environment data, which, after local processing, are sent to one or more sink nodes, which store/handle/transport the data elsewhere on the basis of the type of application.

The present invention is a cross-layer solution that integrates the network layer (routing) with the LLC (Logical Link Control) sublayer of the datalink layer.

The method proposed consists in determining autonomously, node by node, for each packet that is to be transmitted/retransmitted (LLC logic), to which subset of the nodes it is to be transmitted (routing logic) and the maximum number of retransmissions to be made.

For this purpose, for each node, a module is provided, which governs the policy of transmission and retransmission of the LLC layer (top sublayer of the datalink layer of the ISO-OSI model), as well as a routing module, which, using a self-learning algorithm based upon Q-learning, determines, for each packet, also according to the number of times that this has already been transmitted, the optimal set of the nodes to which this packet is to be re-sent, as will be described in detail in what follows.

LLC (Logical Link Control) Sublayer

Figure 2:
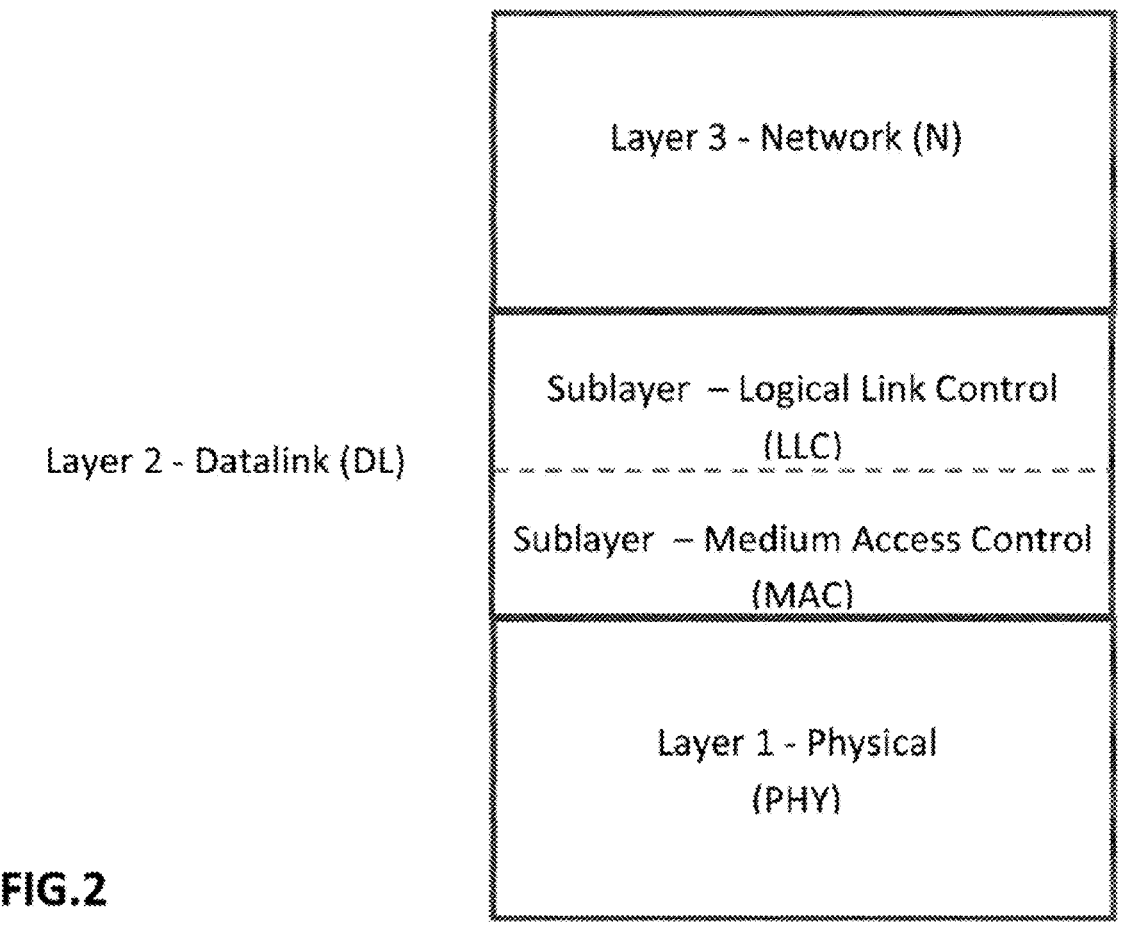
FIG. 2 is a scheme of the OSI protocol stack.
Figure 3:
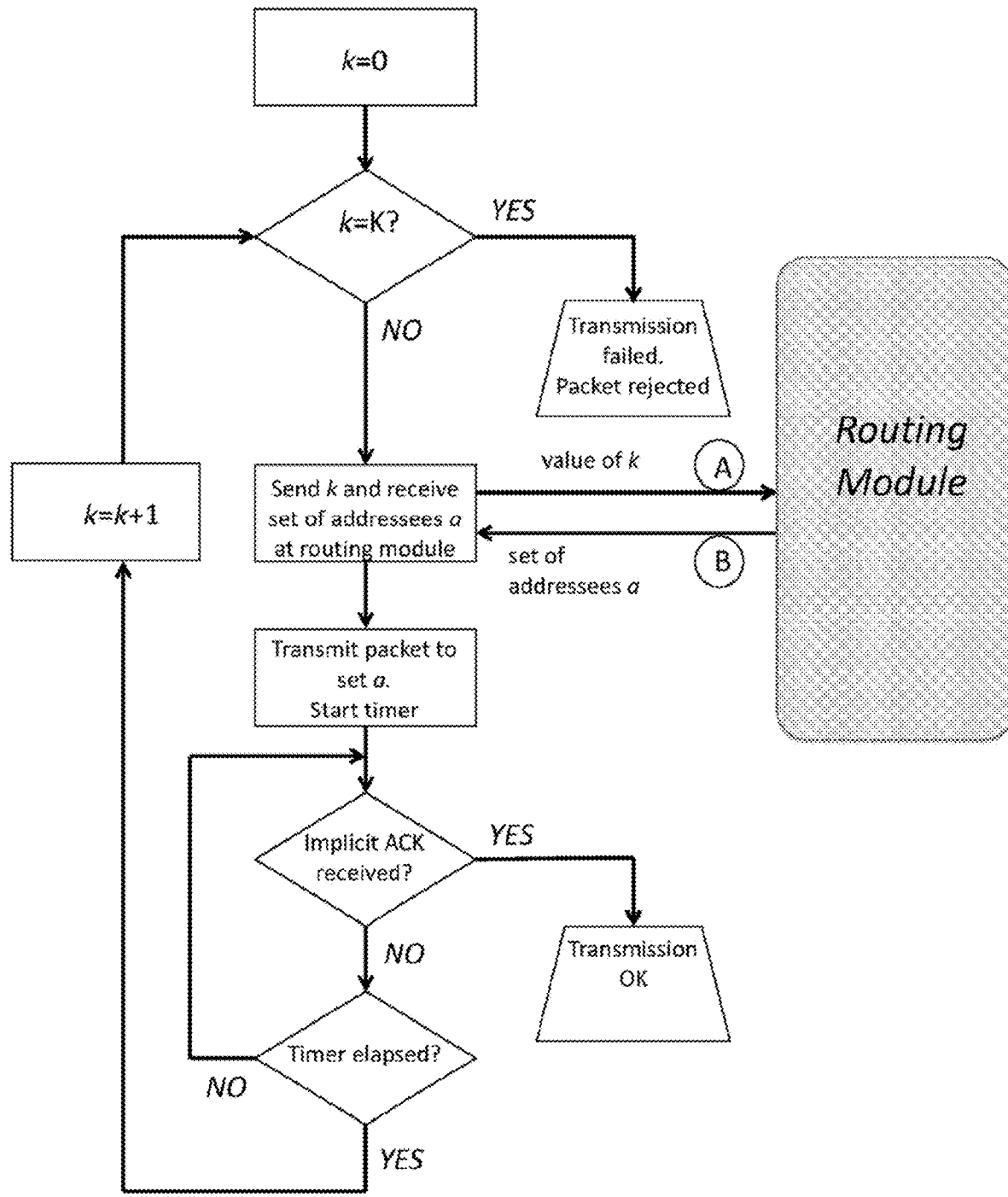
FIG. 3 shows the execution flow of the LLC sub layer.

The LLC sublayer governs the logic of retransmission of a node that is illustrated in FIG. 2. When a node has to send a packet (or re-send a packet, in the case of retransmission), it interfaces with the routing module (arrows A and B) to identify the nodes to which the packet is to be sent. For this purpose, the LLC sublayer sends to the routing module the number of times that the packet has already been (unsuccessfully) transmitted and receives from the latter the set of the nodes to which the packet is to be sent (a set that in general will be a function also of the number of retransmissions of that packet).

The calculation of the set of the nodes could be carried out periodically instead of on a time-to-time basis. The solution proposed is, however, to be preferred given the frequently very long times between successive retransmissions.

After a packet has been sent and a timer has been started, the node goes into a wait state where it waits for an implicit acknowledgement using the overhearing technique: the packet is considered as having been successfully sent if at least one of the nodes to which it had sent the packet retransmits it; if, instead, no transmission of a copy of the packet is detected, it is assumed that none of the nodes has received the packet. In the former case, the next packet is transmitted. In the latter case, the packet is retransmitted after a wait period referred to as backoff.

Each packet is transmitted by each node at most a number K of times, after which the packet is rejected. The parameter K is set dynamically according to the estimate of the intensity of the network traffic as described hereinafter.

Routing Module

The routing module governs the routing logic, determining, for each packet, also according to the number of times that this has already been transmitted, the optimal set of the nodes to which this is to be (re-)sent.

The solution proposed is based upon a general mathematical reinforcement-learning technique known as Q-learning [SuBa98]. The Q-learning method is based upon the Q functions (Q-values), which represent the estimate of the cost associated to each possible action for each possible state of the system. Iteratively, the algorithm updates the various estimates and, on the basis of these, indicates as action to be executed the action of minimum cost.

Figure 4:
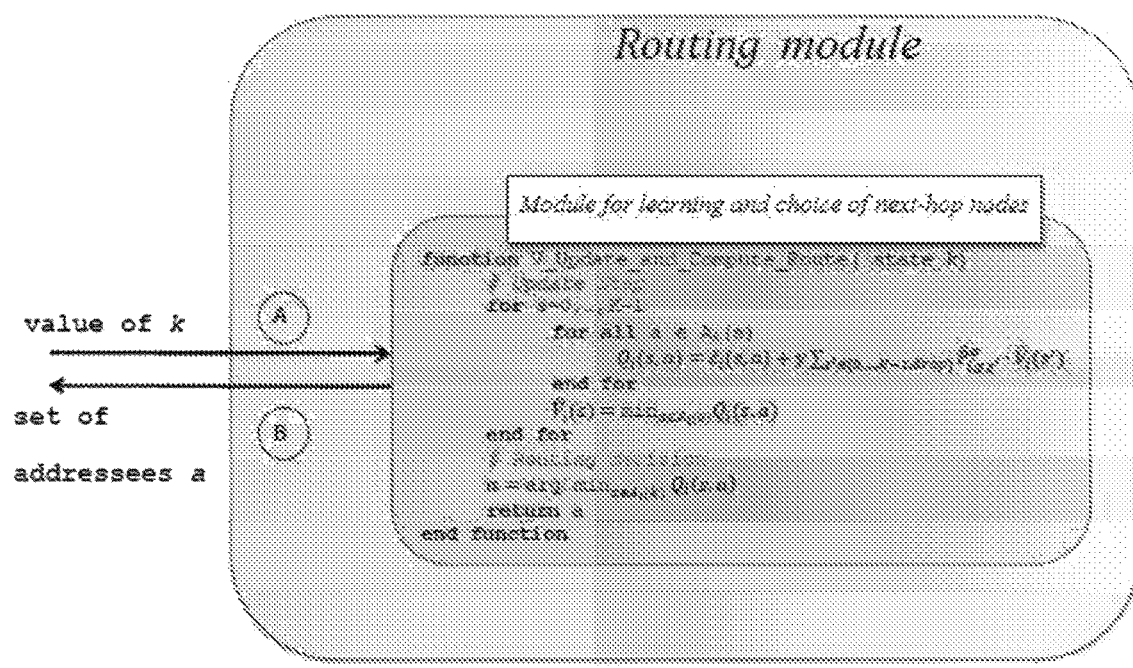
FIG. 4 shows in detail the module for learning and choice of the next-hop nodes.

The specific algorithm used by the routing module is described hereinafter and represented in FIG. 4. In each node, the state of a packet s is represented by the number of times that this has been transmitted (if s=0, the packet has not yet been transmitted, if s=1, the packet has been transmitted already once, etc.), whereas the possible actions a are the various subsets of nodes to which the packet can be sent (if a={j} the packet is sent to just the node j, if a={$j_1, j_2$} the packet is sent to $j_1$ and $j_2$, if a={$j_1, j_2, \ldots, j_n$}, the packet is sent to the nodes {$j_1, j_2, \ldots, j_n$} etc.).

For each state/action pair (s,a), i.e., the pair formed by number of retransmissions and the set of the possible addressees, the routing module of each node i estimates the Q-function $Q_i(s,a)$, i.e., the cost associated to execution of the action a when it is in the state s, i.e., the cost of sending a packet that has already been transmitted s times to the nodes in the set a (lines 2-7).

```
1   function Learning( state k)
2       # Updating of estimates
3       for s=0 , ... , K-1
4           for all a ∈ A_i(s)
5               Q_1(s, a) = ĉ_1(s, a) + γΣ_{s' ∈{0, ... ,F - 1,drop,rev}} P̂_{1,s,s'}^B · min_{B'∈A_1(s')} Q_1(s' , a')
6           end for
7       end for
8       # Choice of subsequent nodes
9       a = arg min_{a∈A_1(k)} Q_i(k, a)
10      return a
11  end function
```

Pseudocode of the Learning Algorithm

Once the various estimates have been updated, the choice of the addressee nodes falls on the set a to which the best cost is associated (line 9).

The probabilities $\hat{P}_{i,s,s'}^a$ for calculation of the values $Q_i(s,a)$ (line 5) are obtained starting from the probabilities $P_{i,j}$ of a packet sent by the node i being correctly received by the node j, as appears below:

$$P_{i,s\ s+1}^a = \prod_{j\in a} (1 - P_{i,j}P_{j,i})$$

$$P_{i,s\ rcv}^a = 1 - \prod_{j\in a} (1 - P_{i,j}P_{j,i})$$

$$P_{i,s\ drop}^a = \prod_{j\in a} (1 - P_{i,j}P_{j,i})$$

The core of the operation of the learning technique is the specification of the cost function associated to the various state/action pairs, which in effect determines the logic of selection of the set of the relays.

In the solution proposed herein, the cost function $c_i(s,a)$ associated to each action is defined below $$c_i(s, a) = \begin{cases} w_e e_i(s, a) + n_i(s, a) & s < K - 1 \\ w_e e_i(s, a) + w_l l_i(s, a) + n_i(s, a) & s = K - 1 \end{cases}$$

where $e_i(s,a)$ is equal to the cost of transmission of a packet to the set of nodes that corresponds to the action, $n_i(s,a)$ is the cost for the nodes downstream to deliver the packet to destination (calculated on the basis of the information exchanged with the neighbours), $l_i(s,a)$ is the cost associated to the possible loss of the packet when this is rejected after the maximum number of retransmissions has been reached, $w_e$ and $w_l$, where $w_e+w_l=1$, are weights, selected on the basis of the applicational requirements.

The expression for the cost of the nodes downstream is $$n_i(s, a) = \sum_{j\in a} c_j P_{i,j}$$

where $c_j$ is equal to the cost for the node j to transmit the packet to destination, i.e., $$c_j = \min_{s\in A_i(0)} Q_i(0,a)$$

this value being periodically broadcast by the nodes, while the expression for $l_i(s,a)$ is $$l_i(s, a) = L \prod_{j\in a} (1 - P_{i,j})$$

where L is a penalty associated to the loss of the packet when this is rejected after the maximum number of retransmissions has been reached, and the product is the probability of the packet having been lost.

Details

Estimate of the Link Quality

Each node keeps track of the number $n_{i,j}$ of the packets correctly received from the neighbouring nodes. This calculation is made on all the packets, irrespective of whether the node is addressee or not of the single packet. Once the node j has received correctly a packet sent by the node i, it determines from the serial number of the packet the number of packets $n_i$ sent by the node and estimates therefrom the link quality as:

$$\hat{P}_{i,j} = \frac{n_{i,j}}{n_i}$$

where the link quality $P_{ij}$ represents the probability of a packet sent by the node i being correctly received by the node j. In order to have estimates that take into account the marked dynamicity of the underwater channel, the values $n_i$ and $n_{i,j}$ are calculated with respect to a sliding time window of appropriate dimensions.

Dynamic Setting of the Maximum Number of Retransmissions K

K is a fundamental parameter of the protocol. A low value contributes to limiting the network traffic, but may lead to a low probability of success of the transmissions. Instead, a high value of K increases the probability of a packet being received, but at the cost of an increase in the network traffic: an adequate value of K with low traffic may easily lead to conditions of network overloading in conditions of sustained traffic, thus leading to network crashing. In the solution proposed, the parameter K is dynamically set in such a way that the mean number of transmissions G, made during a time window the length of which is equal to the time necessary for sending a packet, is equal 0.5 (the idea is to approximate the behaviour of layer 2 of the network as an unslotted broadcast ALOHA network for which it is known that the peak of transmission capacity of the network is obtained at G=0.5).

Using the following approximation for the maximum network load $$G = t_{col} \lambda K$$

where $t_{col}$ is the collision time, i.e., the sum of the time of transmission of a packet and of the maximum network propagation time (a value that can be estimated on the basis of the size of the network itself), and λ denotes the traffic in the network, a value that can be estimated dynamically by each node on the basis of the traffic observed locally, for the maximum number of retransmissions the following formula is obtained:

$$K = \left\lceil \frac{0.5}{t_{col} \lambda} \right\rceil$$

where the notation $\lceil x \rceil$ designates the smallest integer greater than x.

Extension for Dynamic Selection of the Communication Device

It is by now common knowledge that the efficiency of an underwater communication network can be increased using simultaneously heterogeneous communication devices, which may differ as regards bitrate, operating frequency, transmission range, reliability in the communication, etc. This enables a greater adaptability to the changeable conditions of the underwater environment and to different types of networks. In this context, the present invention can be easily extended for selecting, autonomously, node by node, in addition to the subset of the nodes to which to send the packet, also the specific communication apparatus to be used from among the multiple ones that may be available. To do this, it is necessary to change the model discussed previously as follows.

The possible actions a specify not only the different subsets of nodes to which the packet may be sent but also the communication apparatus to be used from among the multiple ones that may be available (if $a=\{m_1, [j]\}$ the packet is sent to just the node j using the apparatus $m_1$, if $a=\{m_2, [j_1, j_2]\}$ the packet is sent to $j_1$ and $j_2$ using the apparatus $m_2$, if $a=\{m_1, [j_1, j_2, \ldots, j_n]\}$ the packet is sent to the nodes $j_1, j_2, \ldots, j_n$ using the apparatus $m_1$, etc.).

The cost of transmission of a packet $e_i^m(s,a)$ takes into account also the specific communication device m chosen for transmitting the packet, given that associated to different devices are, for example, different levels of energy consumption or transmission capacity.

The probability of a packet sent by the node i being correctly received by the node j is defined as $P_{i,j}^m$, since it depends upon the particular device m used. It is calculated as follows: the node j, once it has correctly received a packet sent by the node i using the apparatus m, determines, from the serial number of the packet, the number of packets $n_i^m$ sent by the node using said apparatus and uses as estimate of the quality of the link corresponding to m the ratio $$\hat{P}_{i,j}^m = \frac{n_{i,j}^m}{n_i^m}$$

where $n_{i,j}^m$ is the number of packets sent by the node i with the device m and correctly received by j.

Experimental Results

To highlight the advantages of the invention, illustrated hereinafter are experimental results obtained via simulation. The performance of CARMA was compared with the performance of QELAR [HuFe10], a protocol based upon reinforcement learning that seeks to obtain a homogeneous energy consumption between the nodes but that does not consider multipath, and EFlood [BaPe14], an improved version of the flooding protocol, designed explicitly for reducing collisions and increasing robustness of the protocol. The underwater environment simulated corresponds to a portion of the Norwegian fjord off the coasts of Trondheim. All the information necessary for simulation of the underwater environment was obtained from the World Ocean Database (http://www.nodc.noaa.gov/OC5/WOA05/pr_woa05.html), the General Bathymetric Chart of the Oceans (GEBCO) (http://www.gebco.net), and the National Geophysical Data Center Deck41 database (http://www.ngdc.noaa.gov/mgg/geology/deck41.html).

In the experiments, there was considered a static network of 40 nodes (39 nodes plus the sink node) randomly positioned over a region of 4 km×1 km and at different depths, ranging between 10 and 240 m. The network traffic was generated according to a Poisson process of parameter λ packets per second, where λ assumed values in the set {0.01, 0.02, 0.04, 0.0666, 0.1}. Furthermore, three different packet sizes were considered, namely, 50 B, 500 B, and 1000 B.

The performance of the protocols was evaluated using the following performance metrics:
  packet-delivery ratio (PDR), namely the ratio of packets delivered to the sink node, defined as the fraction between the packets correctly received by the sink node and all the packets generated by the nodes;
  end-to-end latency, defined as the time that elapses between generation of the packet and its correct reception at the sink node; and
  energy per bit, defined as the energy consumed in the network for delivery of a data bit to the sink node.

Results of Simulations

FIGS. 5, 6, and 7 show the performance of the three protocols in the simulation scenario described. The results refer to a size of the packet of 1000 B, which corresponds to the best performance for all three protocols considered (the performance for the other packet sizes are summed up in Table 1). In order to obtain a comparison in the same conditions between the protocols, the characteristic parameters of QELAR and of EFlood were set to the optimal values suggested by the respective authors.

characterized by a high number of transmissions and corresponding high energy consumption.

TABLE 1

Simulation results for different network traffic and packet size.

| | 50 Bytes | | | | | | 500 Bytes | | |
|---|---|---|---|---|---|---|---|---|---|
| | $\lambda\,0.02$ | | | $\lambda\,0.1$ | | | $\lambda\,0.02$ | | |
| Metric | CARMA | QELAR | EFlood | CARMA | QELAR | EFlood | CARMA | QELAR | EFlood |
| Packet Delivery Ratio (%) | 99 | 64 | 85 | 58 | 40 | 49 | 99 | 98 | 73 |
| End-to-end latency (s.) | 3.77 | 198.8 | 39.21 | 14.85 | 1360.0 | 423.8 | 6.56 | 9.58 | 21.23 |
| Energy per bit (J/b) | 0.029 | 0.129 | 0.145 | 0.032 | 0.187 | 0.109 | 0.016 | 0.016 | 0.109 |
| Overhead per bit | 2.48 | 6.44 | 0.23 | 3.67 | 10.15 | 0.18 | 0.17 | 0.055 | 0.160 |

| | 500 Bytes $\lambda\,0.1$ | | |
|---|---|---|---|
| Metric | CARMA | QELAR | EFlood |
| Packet Delivery Ratio (%) | 77 | 20 | 32 |
| End-to-end latency (s.) | 14.68 | 64.0 | 27.68 |
| Energy per bit (J/b) | 0.021 | 0.128 | 0.089 |
| Overhead per bit | 0.29 | 1.12 | 0.132 |

Packet delivery ratio. The PDR that was measured for each protocol appears in FIG. 5. The results are consistent with the expectations. In particular, the PDR decreases as the network traffic increases since the collisions between the packets and the probability of finding the channel occupied increase. In any case, CARMA shows the best performance: its PDR drops from 100% to 85% only when the network traffic is very high.

The performance of CARMA basically depends upon three factors: 1) the protocol minimizes the overall number of transmissions necessary for transmitting a packet from the source to the sink, and consequently is able to identify the routes with the highest probability of delivering the packet to destination; 2) forwarding of the packets in multipath as the retransmissions increase, increases the robustness of the protocol; 3) the maximum number of retransmissions K is calculated dynamically on the basis of the traffic, thus reducing the number of retransmissions when the traffic is higher and consequently reducing the collisions between the packets. Among all the protocols, EFlood shows the worst performance on account of the high number of transmissions, which, above all as the load increases, results in a high number of collisions. On the other hand QELAR shows good performance as long as the traffic in the network is low, but its PDR decays rapidly when the traffic increases. This is because it does not have a dynamic control on the number of retransmissions and because it estimates less accurately than does CARMA the quality of the communication links. At high loads the difficulty of overhearing the packets, which is the main mechanism used by QELAR for estimating the link quality, results in a far from accurate estimate and, consequently, in non-optimal routing decisions.

Energy per bit. FIG. 6 shows the energy consumption for delivery of a databit to the sink. EFlood is the protocol that consumes most for delivery of a bit, above all in low-traffic conditions. It should be recalled that EFLood is a protocol based upon flooding, and hence for its very nature is characterized by a high number of transmissions and corresponding high energy consumption.

CARMA and QELAR show good performance at low traffic intensities, with CARMA that is able to reduce considerably consumption in the case of smaller packet size (Table 1). However, as the level of traffic increases, the performance of the QELAR decays as a result of the higher number of retransmissions and of the lower number of data bits correctly delivered to the sink.

FIG. 8 shows how the energy per bit varies between the network nodes, considering two scenarios corresponding to a low and high load level. The energy efficiency is very uniform in CARMA, whereas it presents a greater variability in the other two protocols.

End-to-end latency. FIG. 7 shows the mean latency for delivery of the packets to the sink node. As may be expected, as the level of traffic increases, also the time necessary for delivery of a packet increases. CARMA delivers the packets in the shortest time in all the scenarios considered. By reducing the number of retransmissions necessary for delivery of a packet, CARMA acts effectively on the latency. EFlood presents, instead, longer latencies, which depend upon the delay introduced for desynchronizing the transmitting nodes, but that remain similar irrespective of the network traffic. In EFlood each packet is transmitted exactly just once by each node (there are no retransmissions), limiting the latency but at the expense of a lower PDR. QELAR presents a latency comparable to that of CARMA at low traffic levels, except that it then increases significantly as the level of traffic increases. This is because the QELAR protocol is characterized by a high retransmission rate (over 150% of the rate when the traffic is low) together with the difficulty in receiving the implicit acknowledgments, which jeopardizes the capacity of routing the packets correctly.

A preferred embodiment of the method forming the subject of the invention has been described herein. It is evident, however, that numerous modifications and variations may be made by the person skilled in the sector, without thereby departing from the sphere of protection of the invention as defined by the ensuing claims.

REFERENCES

[SuBa98] R. S. Sutton and A. G. Barto, Reinforcement Learning: An Introduction. Cambridge Univ. Press, 1998.
[BaPe14] S. Basagni, C. Petrioli, R. Petroccia and D. Spaccini. "CARP: A Channel-aware Routing Protocol for Underwater Acoustic Wireless Networks", in press, Elsevier Ad Hoc Networks and Physical Communication. 2014.
[HuFe10] T. Hu and Y. Fei, "QELAR: A Machine Learning Based Adaptive Routing Protocol for Energy Efficient and Lifetime Extended Underwater Sensor Networks", IEEE Transactions on Mobile Computing, Vol. 9, N. 6, pp. 796-808, June 2010.
[PlWa14] R. Plate, C. Wakayama, "Utilizing kinematics and selective sweeping in reinforcement learning based routing algorithms for underwater networks", in press, Elsevier Ad Hoc Networks and Physical Communication. 2014.
[US2026] US 2012/192026 A1 (CHEN REN-JR [TW] ET AL) 26 Jul. 2012
[US1082] US 2004/071082 A1 (BASU ANINDYA [US] ET AL) 15 Apr. 2004

The invention claimed is:

1. A method for selecting, in an underwater communication sensor network, at each transmission/retransmission of a packet, a set of nodes to which the packet is to be sent, the underwater communication sensor network including, for each node, a module that governs a policy of transmission/retransmission of Logical Link Control (LLC) sublayer and a routing module, the method comprising:
   determining for each packet, using a self-learning algorithm, autonomously and without explicit exchange of acknowledgement messages, an optimal set of nodes to which a respective packet is to be re-sent, wherein the determination is based on a number of times the respective packet has been transmitted;
   determining a maximum number of retransmissions to be performed; and
   selecting a best operating mode, according to specific characteristics of the underwater communication sensor network;
   wherein the LLC sublayer governs retransmission logic of the respective node by performing in succession the following steps:
   when the respective node has to send the respective packet, the respective node interfaces with the routing module of the respective node to identify the optimal set of nodes to which the respective packet is to be sent, wherein the LLC sublayer sends the number of times that the respective packet has already been successfully transmitted to the routing module and receives from the routing module the optimal set of nodes to which the respective packet is to be sent, wherein the optimal set of nodes is a function of the number of times that the respective packet has already been unsuccessfully transmitted to the routing module;
   after the respective node has sent the respective packet and started a timer, the LLC sublayer waits for an implicit acknowledgement using an overhearing technique whereby the respective packet is considered as having been sent successfully in response to at least one node of the optimal set of nodes to which the respective packet is sent retransmitting the respective packet and the LLC sublayer continues transmitting a next packet;
   in response to a lack of retransmission of the respective packet by at least one node of the optimal set of nodes, the respective packet is retransmitted after a backoff period, wherein the maximum number of retransmissions to be performed is a number of K times; and
   in response to the maximum number of retransmissions to be performed being equal to the number of K times, the respective packet is rejected, wherein the number of K times is dynamically set based on an estimated load.

2. The method of claim 1, wherein, as conditions of the underwater communication sensor network vary, using the self-learning algorithm, each node is able to modify a respective policy, wherein the ability to modify includes the ability to modify (i) a number of the optimal set of nodes and an identity of the optimal set of nodes to which the respective packet is to be re-sent and (ii) the maximum number of retransmissions to be performed for the respective packet.

3. The method of claim 2, wherein the self-learning algorithm is identical for each node and is based upon Q-learning.

4. The method of claim 1, wherein the self-learning algorithm includes, for each state, tracking a set of variables $Q_1(s, a)$ for each value of s and a, wherein $Q_1(s, a)$ represents a local estimate of the routing module regarding a cost associated with execution of action a when node a is in state s, wherein a state of the respective packet s represents a number of times the packet has been transmitted, wherein $Q_1(s, a)$ is the cost associated with transmitting the respective packet that has been transmitted s number of times to a set of nodes included in action a, and wherein possible sets of nodes included in action a include:
   $a=\{j\}$: the packet is sent to node j,
   $a=\{j_1, j_2\}$: the packet is sent to nodes $j_1$ and $j_2$, and
   $a=\{j_1, j_2, \ldots j_n\}$: the packet is sent to nodes $j_1, j_2, \ldots j_n$.

5. The method of claim 4, wherein the self-learning algorithm includes that, whenever the respective node has to send the respective packet, the self-learning algorithm updates the local estimate $Q_1(s, a)$ and chooses, based on the local estimate, the optimal set of nodes to which the respective packet is be re-sent.

6. The method of claim 5, wherein the updating step includes:
   calculating a new value of $Q_1(s, a)$ as a sum of: the cost associated with a current transmission of the respective packet that has been transmitted s number of times to the set of nodes included in action a and a mean cost of possible retransmission of the respective packet, wherein the mean cost is discounted by a factor gamma between 0 and 1,
   where the cost associated with the current transmission is equal to a sum of:
   i. a cost of transmission of the respective packet to the set of nodes included in action a;
   ii. a destination cost employed by the set of nodes included in action a to deliver the respective packet to a respective destination, the cost being defined as sum of the cost of transmission of each node j included in the set of nodes included in action a, and wherein each cost of transmission is weighted with a corresponding likelihood of the respective packet sent by the respective node i reaching the respective node j; and
   iii. a loss cost associated with a possible loss of the respective packet in response to the maximum number of retransmissions being reached, wherein the loss cost is defined by the product of a constant L that represents a penalty associated with a loss of the respective packet and a likelihood of the respective packet not being received by any of the set of nodes included in action a,
wherein, in the sum, the cost of transmission and the loss cost are weighted using a weighting value greater than zero, wherein a total sum of the cost of transmission and the lost cost is equal to one; and
in response to a number of retransmissions being less than the maximum number of retransmissions, the loss cost is excluded from the sum.

7. The method of claim 6, wherein the selection of the set of nodes to which the respective packet is to be sent includes the set of nodes included in action a with a lowest cost.

8. The method of claim 1, wherein:
each node calculates and stores a number of packets correctly received from neighbouring nodes, wherein the number of packets correctly received includes packets received when the respective node is not an addressee; and
in response to node j correctly receiving the respective packet sent by node i, node j determines, from a serial number of the respective packet, a number of packets $n_1$ sent by node j to determine a link quality as a ratio between packets received and packets sent, wherein the link quality is calculated during a sliding time window.

9. The method of claim 8, wherein:
the maximum number of retransmissions is equal to a smallest integer greater than a ratio between 0.5 and a product between a time of collision and network traffic, wherein the time of collision is a sum of a time of transmission of the respective packet and a maximum network propagation time, and wherein the network traffic is estimated by each node based on traffic observed locally.

10. The method of claim 4, wherein the self-learning algorithm includes determining autonomously, node by node, a specific communication apparatus to be used from among multiple available communication apparatuses, wherein
each possible action specifies a respective specific communication apparatus to be used including:
a={$m_1$, [j]} if the packet is sent to node j using apparatus $m_1$;
a={$m_2$, [$j_1$, $j_2$]} if the packet is sent to nodes $j_1$ and $j_2$ using apparatus $m_2$; and
a={$m_1$, [$j_1$, $j_2$ ..., $j_n$]} if the packet is sent to nodes $j_1$, $j_2$ ..., $j_n$, using apparatus $m_1$.

11. The method of claim 6, wherein an overall cost associated with the current transmission is equal to the sum of the following three terms:
 i. the cost of transmission of the respective packet using a respective specific communication apparatus specified by action a;
 ii. the destination cost employed by the set of nodes included in action a to deliver the respective packet to a respective destination, the destination cost being defined as the sum of the costs of transmission to each node j included in the set of nodes included in action a, wherein each cost of transmission is weighted with a corresponding probability of the respective packet sent by the respective node i reaching the node j, and wherein the corresponding probability is based on the respective specific communication apparatus; and
 iii. the loss cost associated with the possible loss of the respective packet in response to the maximum number of retransmissions being reached, wherein the loss cost is defined by the product of a constant L that represents the penalty associated with the loss of the packet and a probability of the respective packet not being received by any of the set of nodes included in action a.

12. The method of claim 10, wherein:
each node calculates and stores a number of packets correctly received from neighbouring nodes using the multiple available communication apparatuses, wherein the number of packets correctly received includes packets received when the respective node is not an addressee; and
in response to node j correctly receiving the respective packet sent by node i using apparatus m, node j determines, from a serial number of the respective packet, a number of packets n sent by node j using the apparatus to determine a link quality corresponding to $n^m_i$ as a ratio between packets received and packets sent, wherein the link quality corresponding to $n^m_i$ is calculated during a sliding time window.

* * * * *